US011102519B2

(12) United States Patent
Barnes et al.

(10) Patent No.: US 11,102,519 B2
(45) Date of Patent: Aug. 24, 2021

(54) CENTRALIZED ARCHITECTURE FOR IN-VEHICLE ENTERTAINMENT SYSTEMS

(71) Applicant: Panasonic Avionics Corporation, Lake Forest, CA (US)

(72) Inventors: Andrew Barnes, Mission Viejo, CA (US); Yichao Jiang, Irvine, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/743,308

(22) Filed: Jan. 15, 2020

(65) Prior Publication Data
US 2021/0219002 A1    Jul. 15, 2021

(51) Int. Cl.
*H04N 7/18* (2006.01)
*H04N 21/214* (2011.01)
*H04N 21/2387* (2011.01)
*H04N 21/226* (2011.01)
*G06F 9/455* (2018.01)
*G06F 1/20* (2006.01)

(52) U.S. Cl.
CPC ..... *H04N 21/2146* (2013.01); *G06F 9/45558* (2013.01); *H04N 21/226* (2013.01); *H04N 21/2387* (2013.01); *G06F 1/20* (2013.01); *G06F 2009/45579* (2013.01); *G06F 2009/45595* (2013.01)

(58) Field of Classification Search
CPC ............ H04N 21/2146; H04N 21/226; H04N 21/2387; H04N 21/41422; H04N 21/4627; H04N 21/25816; H04N 21/436

USPC .......................................................... 725/75
See application file for complete search history.

(56) References Cited

U.S. PATENT DOCUMENTS

| 6,240,414 | B1* | 5/2001 | Beizer | G06F 16/1787 |
| 6,249,913 | B1* | 6/2001 | Galipeau | H04N 7/17318 |
| | | | | 348/E5.002 |
| 6,899,390 | B2* | 5/2005 | Sanfrod | B64D 11/0624 |
| | | | | 297/217.4 |
| 7,836,472 | B2* | 11/2010 | Brady, Jr. | H04H 20/62 |
| | | | | 725/76 |
| 7,984,190 | B2* | 7/2011 | Rhoads | H04L 67/327 |
| | | | | 709/248 |
| 8,176,363 | B2* | 5/2012 | Zlotnick | G06F 11/2082 |
| | | | | 714/13 |

(Continued)

FOREIGN PATENT DOCUMENTS

WO        2017129255      8/2017

*Primary Examiner* — Michael B. Pierorazio
(74) *Attorney, Agent, or Firm* — Perkins Coie LLP

(57) ABSTRACT

In-vehicle entertainment (IVE) systems can have a centralized architecture to improve heat dissipation characteristics and weight and/or size of the IVE systems. A centralized system for providing in-vehicle entertainment to passengers on a commercial passenger vehicle includes a printed circuit board (PCB) in a housing locatable in a structure in the commercial passenger vehicle and a plurality of display panels and microcontrollers located in a rear portion of the structure. Each microcontroller is communicably connected to one display panel and the PCB. The PCB includes a processor configured to decode audio and/or video content and to operate a plurality of virtual machines that correspond to and perform operations such as playback functionality related to the plurality of display panels.

20 Claims, 5 Drawing Sheets

(56) References Cited

U.S. PATENT DOCUMENTS

| | | | | |
|---|---|---|---|---|
| 8,649,161 B2* | 2/2014 | Kato | ................ | H04N 21/41422 361/679.01 |
| 8,782,637 B2* | 7/2014 | Khalid | ................ | G06F 9/45508 718/1 |
| 9,041,670 B2* | 5/2015 | Kobayashi | ....... | H04N 21/42224 345/173 |
| 9,083,581 B1* | 7/2015 | Addepalli | ................ | G06F 9/542 |
| 9,509,937 B2* | 11/2016 | Easterling | ........ | H04N 21/43615 |
| 9,961,373 B2* | 5/2018 | Margis | ................ | G06F 3/04842 |
| 10,097,603 B2* | 10/2018 | Watson | .............. | H04N 21/2146 |
| 10,256,646 B2* | 4/2019 | Suen | ................ | H02J 7/0013 |
| 10,348,832 B2* | 7/2019 | Bedekar | ............. | H04L 67/1044 |
| 2006/0174285 A1* | 8/2006 | Brady | ................ | H04N 21/2146 725/76 |
| 2007/0106771 A1* | 5/2007 | Lucash | ............... | H04L 67/1095 709/223 |
| 2007/0250873 A1* | 10/2007 | Ohyama | ............... | H04L 65/608 725/82 |
| 2008/0016081 A1* | 1/2008 | MacMillan | ........... | G06F 16/437 |
| 2008/0016196 A1* | 1/2008 | MacMillan | ............. | H04L 43/00 709/223 |
| 2012/0112694 A1* | 5/2012 | Frisch | .................... | G07C 5/008 320/109 |
| 2012/0233610 A1* | 9/2012 | Mandre | ................ | G06F 9/4856 718/1 |
| 2013/0093958 A1* | 4/2013 | Yoshikawa | ......... | H04M 1/7253 348/705 |
| 2013/0144487 A1* | 6/2013 | Suzuki | .................... | G06F 17/00 701/36 |
| 2014/0059184 A1* | 2/2014 | Bird | .................... | G06F 13/4081 709/219 |
| 2014/0074918 A1* | 3/2014 | Wang | ...................... | G06F 7/582 709/203 |
| 2014/0366125 A1* | 12/2014 | Murata | ................ | G01C 21/362 726/17 |
| 2015/0256580 A1* | 9/2015 | Morton | ........... | H04N 21/64322 709/219 |
| 2015/0334441 A1* | 11/2015 | Sukegawa | ............... | G06F 21/44 725/25 |
| 2016/0055011 A1* | 2/2016 | Choi | .................... | G06F 13/102 710/10 |
| 2016/0335108 A1* | 11/2016 | Ryu | .................... | G06F 9/45558 |
| 2016/0344792 A1* | 11/2016 | Sinivaara | .......... | H04N 21/43637 |
| 2019/0118950 A1* | 4/2019 | Pozzi | ................ | B64D 11/0015 |

\* cited by examiner

CENTRALIZED ARCHITECTURE FOR IN-VEHICLE ENTERTAINMENT SYSTEMS

TECHNICAL FIELD

This document is directed generally to in-vehicle entertainment monitor systems in commercial passenger vehicles.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes a centralized architecture for an in-vehicle entertainment (WE) system so that hardware resources can be shared by a group of monitors in a commercial passenger vehicle.

An example embodiment describes a centralized system for providing in-vehicle entertainment to passengers on a commercial passenger vehicle, where the centralized system comprises a housing locatable in a structure located in the commercial passenger vehicle, a first set of a plurality of display panels and a plurality of microcontrollers located in a rear portion of the structure. The housing comprises a printed circuit board (PCB) comprising at least one processor configured to operate a plurality of virtual machines corresponding to a first set of a plurality of display panels located in a rear portion of the structure, receive, for a second set of one or more display panels, one or more video contents from a server located in the commercial passenger vehicle, where the first set of display panels comprise the second set of display panels, decode the one or more video contents, and transmit the decoded one or more video contents to be displayed by the second set of display panels, where one or more virtual machines are operable to control playback functionality for the decoded one or more video contents associated with the second set of display panels. The plurality of microcontrollers are located in the rear portion of the structure, where each microcontroller is communicably connected to one display panel and the PCB, and where each microcontroller is configured to receive a decoded video content from the PCB and send the decoded video content to the one display panel to display.

Another example embodiment describes a method of providing in-vehicle entertainment to passengers on a commercial passenger vehicle, the method comprising operating a plurality of virtual machines corresponding to a first set of a plurality of display panels located in the commercial passenger vehicle, receiving, for a second set of one or more display panels, one or more video contents from a server located in the commercial passenger vehicle, where the first set of display panels comprise the second set of display panels, decoding the one or more video contents, and transmitting the decoded one or more video contents to be displayed by the second set of display panels, where one or more virtual machines control playback functionality for the decoded one or more video contents associated with the second set of display panels.

In yet another exemplary aspect, the methods described in this patent document, including the above-described methods, are embodied in the form of processor-executable code and stored in a non-transitory computer-readable storage medium. The code included in the non-transitory computer-readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
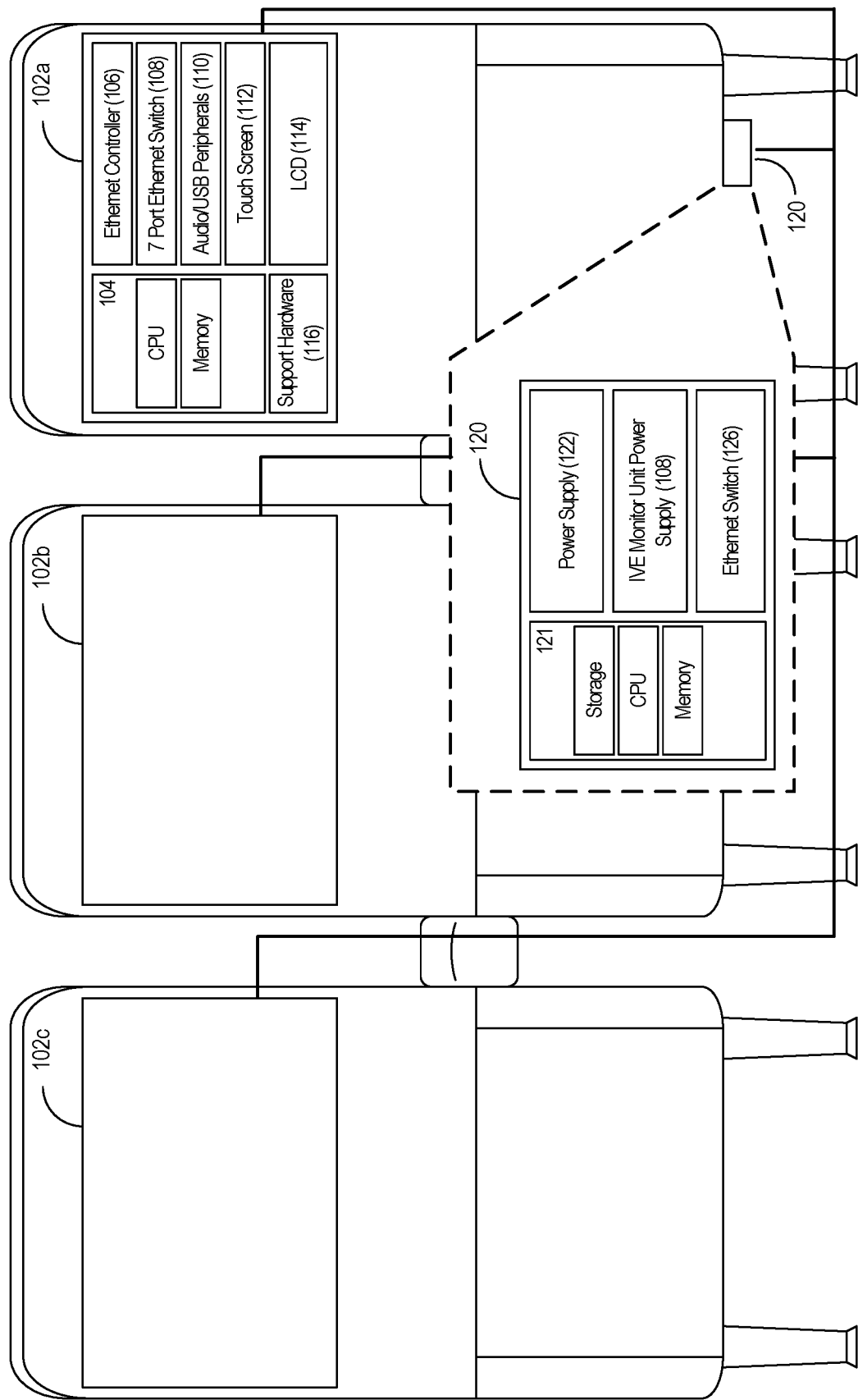
FIG. 1 shows conventional in-vehicle entertainment (WE) monitor units located on seats in airplanes or other commercial vehicles.

FIG. 1 shows conventional in-vehicle entertainment (WE) monitor units 102a-102c located on a row of three seats in airplanes or other commercial vehicles. The WE monitor units 102a-102c are communicably or electrically coupled to a seat box unit 120 that may be located below the seats on which the WE monitor units 102a-102c are located. The WE monitor units 102a-102c are located on seatbacks of seats in the commercial passenger vehicle. can display video content obtained from the seat box unit 120. As shown in FIG. 1 and further described below, the WE monitor units 102a-102c and the seat box unit 120 includes several electrical components.

The various components of the conventional seat box unit 120 are shown in an expanded inset. The conventional seat box unit 120 includes a printed circuit board (PCB) 104 that includes a processor, memory, storage (e.g., solid-state drive) and peripherals. The seat box unit 120 also includes the following components that are connected to or in communication with the PCB 120: power supply 122, WE monitor unit power supply 124, and an ethernet switch 126. The power supply 122 can provide power to the devices or electronics in the PCB 121, the WE monitor unit power supply 124 can provide power to the devices or electronics in the WE monitor units 102a-102c. The ethernet switch 126 in the seat box unit 120 can be connected to ethernet switch 108 of the IVE monitor units 102a-102c via ethernet cables.

The conventional WE monitor units 102a-102c can be a standalone device that includes various components packaged together into one housing to comprise an integrated single device. For ease of description, FIG. 1 shows a block diagram of the components of only the WE monitor unit 102a. The WE monitor units 102b-102c have the same components as those shown for WE monitor unit 102a. The WE monitor unit 102a includes its own PCB 104 that includes a processor, memory, and peripherals. The IVE monitor unit 102a may also include the following components that are connected to or in communication with the PCB 104: ethernet controller 106, ethernet switch 108, audio or USB peripherals 110, touch screen (or display) 112, an optional liquid crystal display (LCD) 114. The WE monitor unit 102a also includes a support hardware 116 that can enable the WE monitor unit 102a to perform the various operations related to audio or video content reception (e.g., power regulator, ethernet transceiver, etc.,). There are several technical drawbacks to the conventional WE monitor unit.

Conventional WE monitor units 102a-102c tend to generate significant heat at least because the various components of an WE monitor unit are integrated into a single device. For example, the integrated WE monitor unit 102a may generate significant heat when a processor on a PCB 104 decodes audio and/or video while the monitor 112 displays the video content. While active or passive cooling options can be added to dissipate heat in a conventional WE monitor unit, such designs can increase the mechanical design complexity, the cost, and the overall dimensions of a conventional WE monitor unit. Furthermore, the heat generated by a conventional WE monitor unit can deteriorate the performance or lifespan of the various components within the conventional WE monitor unit. For example, the processor on the PCB 104 may reduce the performance of internal processor 112 if the temperature of the WE monitor unit 102a exceeds a pre-determined limit.

Convention IVE monitor units 102a-102c have additional technical drawbacks. For example, if a bigger display panel is required, most likely the entire integrated IVE monitor unit 102a will have to be designed and/or replaced, even if the performance of the PCB 104 in the WE monitor unit 102a is sufficient for the bigger display panel. In another example, if the devices or electronics within the WE monitor unit 102a needs an upgrade for higher performance or lower power consumption while keeping the same display panel 112, the entire integrated IVE monitor unit 102a will have to be designed and/or replaced. Thus, the parts in the conventional WE monitor units 102a-102c are difficult to replace or upgrade, which can add significant cost to customers of the conventional IVE monitor units.

To overcome at least these technical drawbacks, among others, this patent document describes centralized architectures for IVE systems. The centralized architecture can enable hardware resources to be shared by a group of monitors in the WE systems. One of the technical benefits of the centralized architecture is that the various parts of the IVE system can be easily upgraded or replaced without affecting the other parts of the WE system. Compared to the conventional integrated WE monitor unit, the exemplary WE monitor units described in this patent document can have improved heat dissipation characteristics at least because some of the components of the WE system can be separated and located in different places in, for example, a seat of a commercial passenger vehicle. Furthermore, the centralized architecture can enable the exemplary IVE monitor units to be designed with reduced weight and mechanical dimensions, which is a beneficial technical feature for commercial passenger vehicles (e.g., airplanes) that may have strict limits on the amount of space and/or weight of the IVE monitor units installed in the commercial passenger vehicles.

Figure 2:
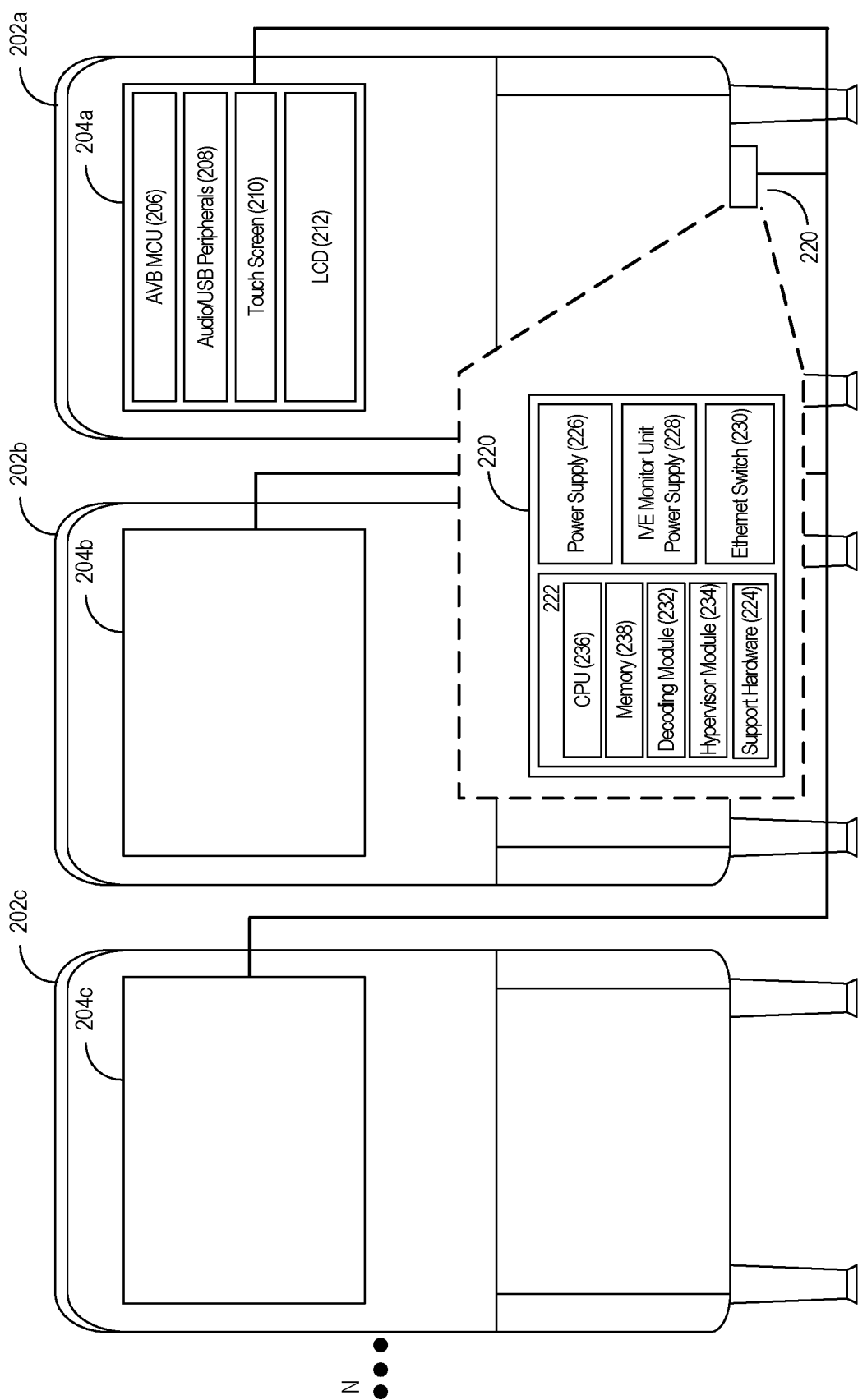
FIG. 2 shows an exemplary centralized architecture for an WE system for commercial passenger vehicles.

FIG. 2 shows an exemplary centralized architecture for an IVE system for commercial passenger vehicles. The centralized architecture of an IVE system includes IVE monitor units 204a-204c installed on or in a structure (e.g., on a rear portion or seatback of a row of three seats 202a-202c) of a commercial passenger vehicle, such as an airplane, train, a ship, or a bus. The centralized architecture of the IVE system also includes a seat box unit 220 that may be located in an enclosure or housing below the seats 202a-202c. For ease of description, FIG. 2 shows a block diagram of the components of only the IVE monitor unit 204a. The IVE monitor units 204b-204c have the same components as those shown for IVE monitor unit 204a. FIG. 2 shows an example of a three-seat implementation, in some embodiments, the centralized architecture can be implemented from two-seats up to N-seats as indicated to the left of seat 202c. In some embodiments, the centralized architecture of FIG. 2 can be implemented for a structure comprising a single seat.

The IVE monitor unit 202a includes an audio video bridging microcontroller 206 (AVB microcontroller) that is communicably (or electrically) connected to and/or in communication with a PCB 222 located in the seat box unit 220. For example, the AVB microcontroller 206 can be connected via an ethernet cable the PCB 222. Video content is decoded by decoding module 232 of the PCB 222 and can be sent to monitor unit 204 directly for display. The IVE monitor unit 204a may also include audio and/or universal serial bus (USB) peripherals 208 (e.g., audio jack and/or USB connector), where the AVB microcontroller 206 can control the audio and/or USB peripherals (e.g., by sending decoded audio content to the audio jack). The AVB microcontroller 206 and the audio/USB peripherals 208 can be located on a PCB that can be located in a seatback where the touch screen display 210 may be installed. In some embodiments, the AVB microcontroller may be an ethernet device that supports the AVB standard.

The IVE monitor unit 204 also includes a touch screen display 210 to display the received decoded video content, and an optional liquid crystal display (LCD) 212 that can be used to turn on/off the touch screen display 210, increase or decrease volume, and/or increase or decrease touch screen display 210 brightness. In some embodiments, the touch screen display 210 can have a 1080p or 4K resolution.

The various components of the exemplary seat box unit 220 are shown in an expanded inset. A commercial passenger vehicle can include a plurality of seat box units 220, where each seat box unit 220 includes a PCB 222 that is communicably connected to and/or in communication with a group of AVB microcontrollers 206 located in their respective monitor units 204a-204c. In an example embodiment, as shown in FIG. 2, PCB 222 in a seat box unit 220 can be communicably connected to and/or in communication with three WE monitor units' 204a-204c AVB microcontrollers 206.

The PCB 222 includes one or more processors 236 and a memory 238 having instructions stored thereupon. The instructions upon execution by the at least one processor 236 configure the at least one processor 236 to perform the operations described for the decoding module 232, the hypervisor module 234 and/or the various embodiments described in this patent document. The PCB 222 can be communicably connected to the AVB microcontrollers 206 via the ethernet switch 230. The PCB 222 can be electrically connected to an ethernet switch 230 located in the seat box unit 220, where the ethernet switch 230 can route or send Internet Protocol (IP) traffic to the AVB microcontrollers 206 in the WE monitor units 204a-204c, and where the ethernet switch 230 can be communicably connected to and can receive audio and/or video content from the edge server located in the commercial passenger vehicle.

The number of monitor units 214 which the seat box unit's PCB 222 can be connected can depend on a resolution of the touch screen display 210. For example, if the touch screen display 210 has a resolution of 1080p, then the PCB 222 can be communicably connected to and/or in communication with three WE monitor units 204a-204c. In another example, if the touch screen display 210 has a resolution of 4K, then the PCB 222 can be communicably connected to and/or in communication with two WE monitor units' 204a-204b AVB microcontrollers 206 that may be located in rear portions of two seats.

In some embodiments, the seat box unit 220 may include a single housing in which the PCB 220 may be located. In some embodiments, a same housing or enclosure for the seat box unit 220 may be used to include more than one identical PCBs 222 so that high resolution decoded video content can be sent to touch screen displays having a high resolution (e.g., 4K). For example, a first PCB 222 in a seat box unit 220 may be communicably connected to and/or in communication with two IVE monitor units 204a-204b, and a second PCB 222 in the same seat box unit 220 may be communicably connected to and/or in communication with the monitor unit 204c. Thus, the centralized architecture can provide a scalable the seat box unit 220.

The seat box unit 220 also includes the following components that may be communicably connected to or in communication with the PCB 222: power supply 226 and IVE monitor unit power supply 228. The power supply 226 can provide power to the devices or electronics in the PCB 222, and the IVE monitor unit power supply 228 can provide power to the devices or electronics in the IVE monitor units 204a-204c. The PCB 222 may include an ethernet transceiver that receives information from the ethernet switch 230 in the seat box unit 220. The PCB 222 also includes a support hardware 224 that can enable the at least one processor 236 on the PCB 222 to perform the various operations related to audio or video content reception. For example, the support hardware 224 can include power regulator, ethernet transceiver, and/or audio digital signal processor (audio DSP).

In the centralized architecture, the decoding module 232 of the PCB 222 can receive audio and/or video content from the edge server, decode the audio and/or video content, and send the decoded audio and/or video content to the IVE monitor unit 204a. For example, the decoding module 232 may use a video codec to decode digital video content that may have been encoded using the H.264, H.265 or MPEG standard. In the centralized architecture, the hypervisor module 234 of the PCB 222 can perform a number of operations as further described in FIG. 3.

Figure 3:
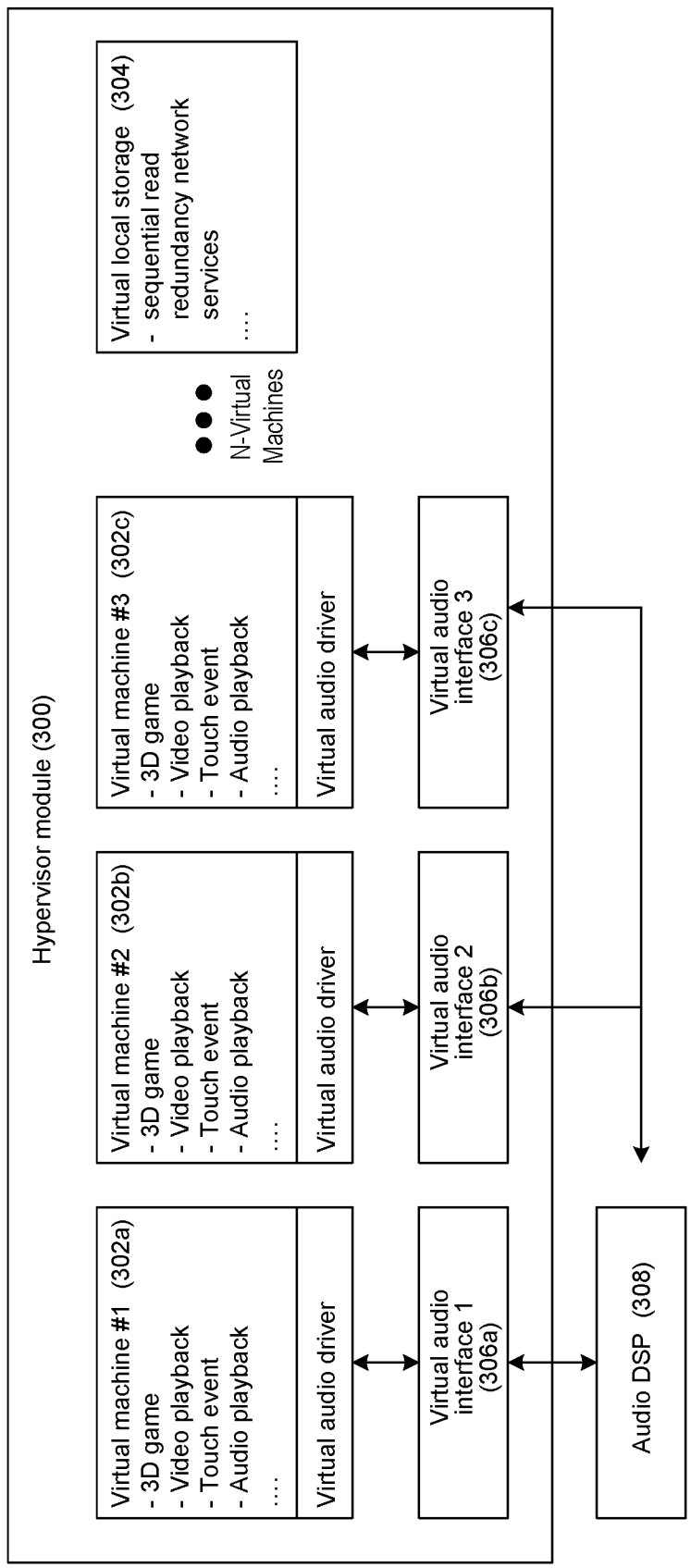
FIG. 3 shows a block diagram of operations performed by a hypervisor module operating on a printed circuit board (PCB) in a seat box unit.

FIG. 3 shows a block diagram of operations performed by a hypervisor module of the centralized architecture. A list of operations that can be performed by the hypervisor is first provided followed by a detailed explanation below. The hypervisor module 300 can operate a number of virtual machine operating systems, perform resource arbitration, provide a virtual network interface, provide graphic processor unit (GPU) sharing, and/or multi stream audio processing. FIG. 3 shows an example of a three-virtual machines that can correspond to three IVE monitor units. In some embodiments, the centralized architecture can be implemented from two-virtual machines up to N-virtual machines as indicated to the right of virtual machine #2 302c. In some embodiments, the centralized architecture of FIG. 3 can be implemented for a single virtual machine. In some embodiments the GPU may be part of the one or more processors of the PCB in the seat box unit. In some embodiments, the hypervisor module 300 can also perform video decoding and/or encoding of video content received from an edge server located in the commercial passenger vehicle.

In FIG. 3, the hypervisor module can create and operate a number of virtual machines, where each virtual machine can perform operations related to one IVE monitor unit, and where each virtual machine can a privileged virtual machine operating system. For example, virtual machine #1 302a can perform operations associated with IVE monitor 204a, virtual machine #2 302b can perform operations associated with IVE monitor 204b, virtual machine #3 302c can perform operations associated with IVE monitor 204c, and so on. The hypervisor module can independently operate each virtual machine to perform one or more operations related to 3D game, video playback, touch event (e.g., when a person touches the touch screen display), audio playback, etc., For example, if a person touches a playback button (e.g., "play" or "pause") displayed on a graphical user interface (GUI) on a touch screen display of a IVE monitor 204a, the virtual machine #1 operating in the hypervisor module can perform an operation indicated by the touched playback button.

The hypervisor module 300 can also arbitrate and buffer input/output (I/O) requests from one or more operating systems operated by the one or more processors of the PCB of the seat box unit, can add security checks for accessing peripherals, can arbitrate memory resources, can resolve memory and I/O contention in multiple simultaneous I/O requests, and can add memory protection and error handling. In some embodiments, the hypervisor module 300 can include support for operating multiple operations systems concurrently by the one or more processors of the PCB of the seat box unit. In some embodiments, hypervisor module and/or the virtual machines may perform their operations by sharing memory resources from a same memory in the PCB in the seat box unit.

The hypervisor module 300 can also perform operations related to a virtual local storage such as by performing sequential read redundancy network services. The operations related to the virtual local storage and redundant network services are described in U.S. Pat. Nos. 9,961,373, 10,097,603, and/or 10,348,832. The entire contents of the above identified U.S. patents are incorporated by reference in its entirety for all purposes in this patent document.

FIG. 3 also shows the hypervisor module receiving decoded audio from an audio DSP 308 that can be part of the support hardware in the PCB of the seat box unit, as described in FIG. 2. The audio DSP 308 can include an audio codec that can decode audio content received from the edge server on the commercial passenger vehicle. The audio content received from the edge server may relate to the video content being displayed on a touch screen display of an IVE monitor unit. The hypervisor module can operate each virtual machine to include a virtual audio driver that can receive the decoded audio content corresponding to the virtual machine via a respective virtual audio interface (or software audio interface). For example, virtual audio driver for virtual machine #1 can receive decoded audio content from virtual audio interface 1 306a, virtual audio driver for virtual machine #2 can receive decoded audio content from virtual audio interface 2 306b, and so on. The virtual audio interfaces 1-3 306a-306c receive audio content from the audio DSP 308. Each virtual machine can send the decoded audio content to an AVB microcontroller in an IVE monitor unit associated with that virtual machine, where the AVB microcontroller sends the decoded audio content to the audio connector or headphone jack associated with the IVE monitor unit. The hypervisor module 300 can separate the decoded audio content received by the hypervisor module 300 from the audio DSP 308 so that the decoded audio content can properly sent to each virtual machine for audio playback.

Figure 4:
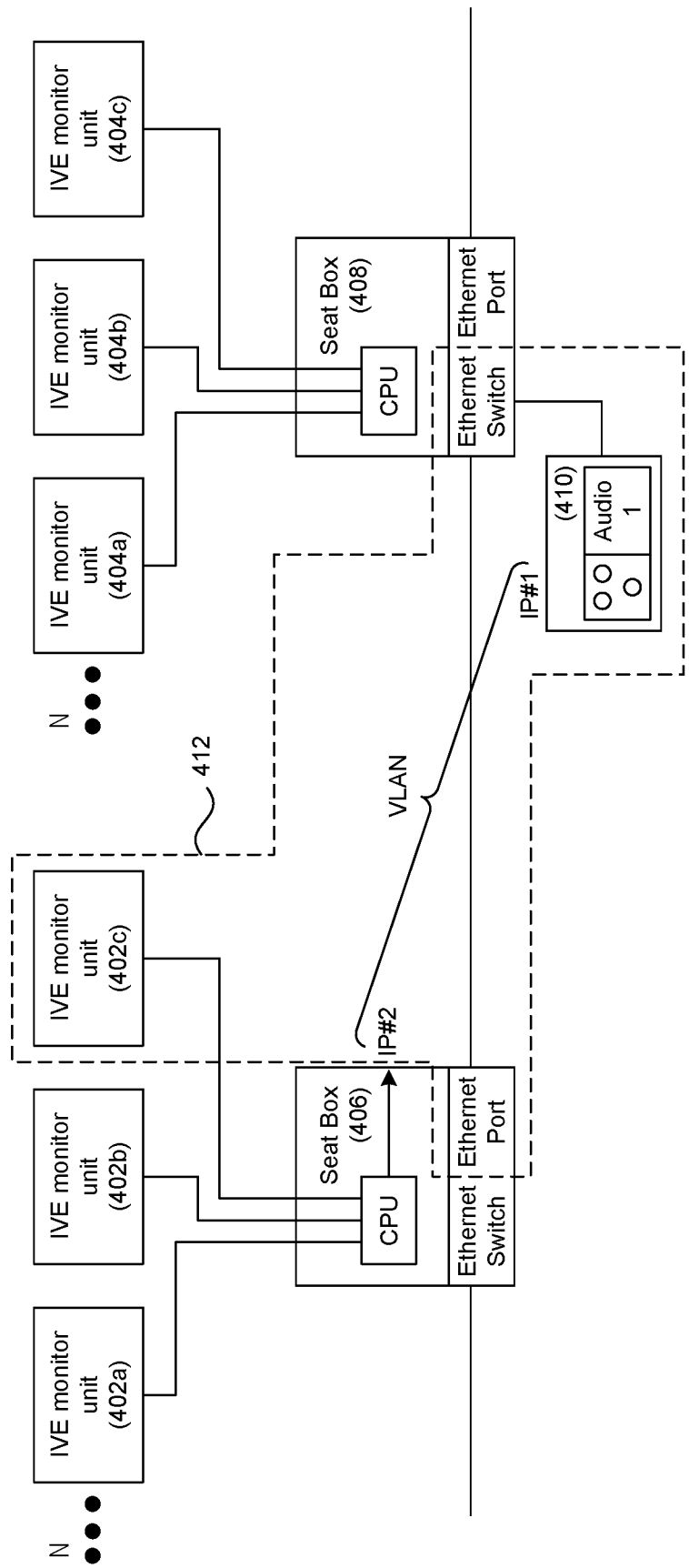
FIG. 4 shows an example scenario audio routing performed by the seat box unit.

FIG. 4 shows an example scenario audio routing performed by the seat box unit. In the example scenario of FIG. 4, the IVE monitor units 402*a*-402*b* with displays are located on a row that is immediately in front of the IVE monitor units 404*a*-404*b* with displays. FIG. 4 shows an example of a three-seat implementation with three IVE monitor units. In some embodiments, the centralized architecture can be implemented from two-seats with two IVE monitor units up to N-seats with N-IVE monitor units as indicated to the left of IVE monitor units 402*a*, 404*a*. In some embodiments, the centralized architecture of FIG. 4 can be implemented for structure comprising a single IVE monitor unit.

In some implementations, one or more headphone audio jacks 410 for content displayed on a display for IVE monitor 402*c* are located on the seat on whose seatback is installed the IVE monitor unit 404*c*. To enable decoded audio from the audio DSP to be routed to the headphone audio jack(s) 410, the hypervisor module can create a virtual LAN (VLAN) 412 that includes the IP addresses (e.g., IP #1, IP #2) of the seat box units 406 and 408. Decoded audio can be routed to the proper seat box using based on an IP address (e.g., IP #1) of the seat box unit associated with the head phone jack(s) 410. In some other implementations, the headphone audio jack(s) 410 for content displayed on IVE monitor unit 402*c* can be located next to the IVE monitor unit 402*c* so that the hypervisor module of the PCB of seat box unit 406 can decode and send audio to the headphone audio jack 410.

The operations performed by the decoder module and the hypervisor module provide several technical benefits over conventional technology. For example, in conventional WE systems, the WE monitor units decode video sent by the PCB in the seat box unit. In the exemplary centralized architecture, the decoder module can decode video and can send the decoded video to the monitor unit. As mentioned above, conventional IVE monitor units can be designed to manage the heat dissipated due to video decoding, however such designs can increase the mechanical design complexity, the cost, and the overall dimensions of a conventional WE monitor unit. By having the decoding module decode the video in the seat box unit, the centralized architecture can better manage heat dissipation caused by video decoding at least because active cooling option(s) (e.g., fan) and/or passive cooling option(s) (e.g., heatsink) can be more easily added to the seat box units that may be located in seats. Furthermore, since seat box units can be located in seats and may not be noticed by passengers, cooling option(s) can be added to seat box units while minimizing the impact of any increased size of the seat box unit on the passengers' perception of the amount of space available to them.

The hypervisor module also provides several technical advantages. For example, a conventional WE systems can utilize at least four processors and memories for a group comprising a seat box unit and three WE monitor units (as shown in FIG. 1). Such a system, however, tends to waste computational resources at least because each of the at least four processors and memories may not be adequately utilized up to their capabilities. For example, if passengers do not wish to operate their IVE monitor units, the processors in such units may still consume power and may be powered on just in case the passengers want to operate their WE monitor units. Unlike the conventional IVE systems, the exemplary centralized architecture includes a hypervisor module that can enable one or more processors located in a seat box unit to more effectively utilize the one or more processors' available computational resources and can also share resources (e.g., memory) on the PCB of the seat box unit. Accordingly, the hypervisor module can minimize waste associated with multiple processors being deployed on conventional WE monitor units where the multiple processors may not be adequately utilized.

Figure 5:
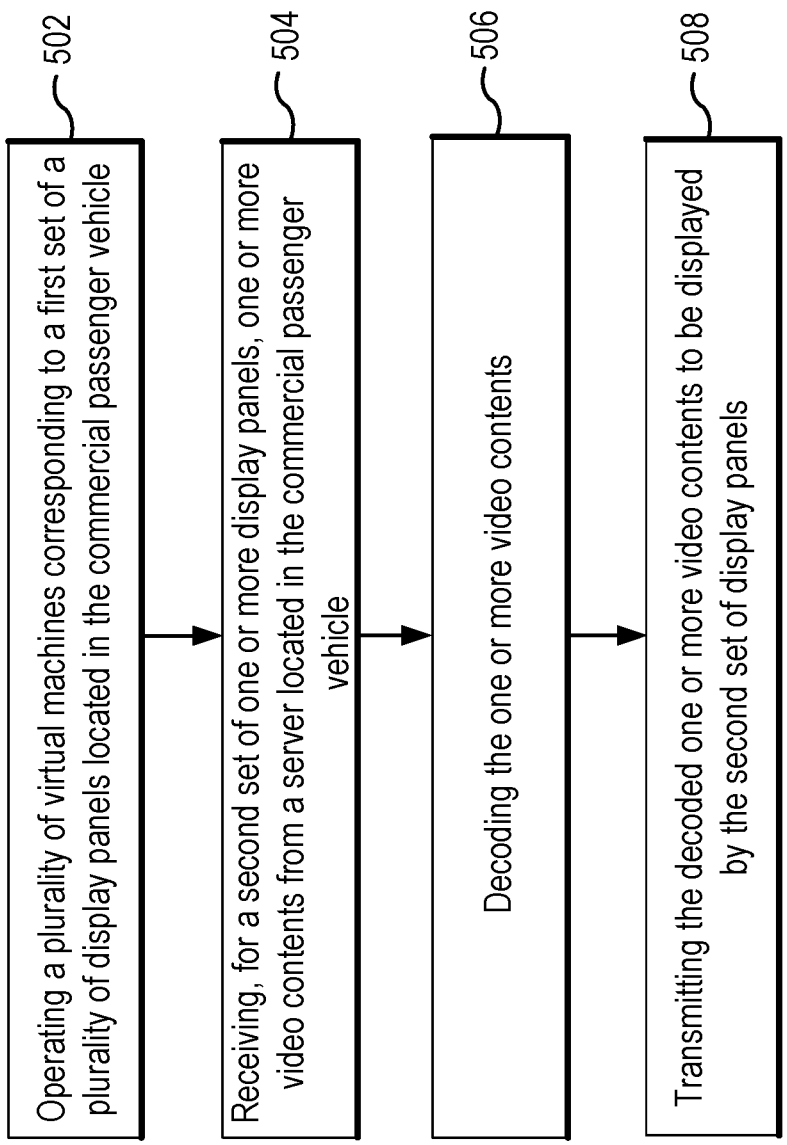
FIG. 5 shows an example flowchart of operations performed by a processor in the PCB in the seat box unit.

FIG. 5 shows an example flowchart of operations that can be performed by a processor in the PCB in the seat box unit to provide in-vehicle entertainment to passengers on a commercial passenger vehicle. Operation 502 includes operating a plurality of virtual machines corresponding to a first set of a plurality of display panels located in the commercial passenger vehicle.

Operation 504 includes receiving, for a second set of one or more display panels, one or more video contents from a server located in the commercial passenger vehicle, where the first set of display panels comprise the second set of display panels. In some embodiments, a number of the second set of one or more panels may be less than or equal to a number of the first set of one or more panels at least because, based on passengers' preferences, a number of display panels for which video content may be requested can be less than or equal to a number of display panels that can display video content. Operation 506 includes decoding the one or more video contents. Operation 508 includes transmitting the decoded one or more video contents to be displayed by the second set of display panels, where one or more virtual machines control playback functionality for the decoded one or more video contents associated with the second set of display panels.

In some embodiments, the one or more virtual machines share memory resources from a memory device. In some embodiments, the method of FIG. 5 further comprises decoding one or more audio contents corresponding to the one or more virtual machines, where the one or more virtual machines receive and send the decoded one or more audio contents to one or more audio connectors corresponding to the one or more virtual machine. In some embodiments, the one or more audio content corresponds to the one or more video contents for the second set of display panels.

In some embodiments, the operating of the plurality of virtual machines, the receiving of the one or more video contents, the decoding of the one or more video contents, and the transmitting of the decoded one or more video contents are performed by a processor on a printed circuit board (PCB) located in a housing below the first set of display panels. In some embodiments, the first set of display panels are located in a rear portion of a structure in the commercial passenger vehicle. In some embodiments, the structure comprises at least two seats in the commercial passenger vehicle.

An example embodiment describes a centralized system for providing in-vehicle entertainment to passengers on a commercial passenger vehicle, where the centralized system comprises a housing locatable in a structure located in the commercial passenger vehicle, a first set of a plurality of display panels and a plurality of microcontrollers located in a rear portion of the structure. The housing includes a printed circuit board (PCB) comprising at least one processor configured to operate a plurality of virtual machines corresponding to a first set of a plurality of display panels located in a rear portion of the structure, receive, for a second set of one or more display panels, one or more video contents from a server located in the commercial passenger vehicle, where the first set of display panels comprise the second set of display panels, decode the one or more video contents, and transmit the decoded one or more video contents to be displayed by the second set of display panels, where one or more virtual machines are operable to control playback functionality for the decoded one or more video contents associated with the second set of display panels. The centralized system also includes a plurality of microcontrollers located in the rear portion of the structure, where each microcontroller is communicably connected to one display panel and the PCB, and where each microcontroller is configured to receive a decoded video content from the PCB and send the decoded video content to the one display panel to display.

In some embodiments, the one or more virtual machines are operable to share memory resources from a memory device located on the PCB. In some embodiments, the PCB comprises an audio digital signal processor (DSP) operable to decode one or more audio contents, the decoded one or more audio contents correspond to the one or more virtual machines, and the one or more virtual machines are operable to receive and send the decoded one or more audio contents to one or more audio connectors corresponding to the one or more virtual machine. In some embodiments, the one or more audio content corresponds to the one or more video contents for the second set of display panels.

In some embodiments, the structure comprises at least two seats in the commercial passenger vehicle. In some embodiments, the first set of display panels are located above the housing. In some embodiments, the housing includes a fan or a heat sink. In some embodiments, the first set of display panels includes touch panels.

This patent document describes the centralized architecture technology in the context of a structure comprising three seats and three WE monitor units for ease of description. In some embodiments, the centralized architecture technology described in this patent document can be implemented on a structure comprising two seats that include two WE monitor units or a structure comprising up to N-seats that include up to N-WE monitor units. In some embodiments, the centralized architecture technology described in this patent document can also be implemented on a structure comprising a single seat with a single IVE monitor unit.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A centralized architecture system for providing in-vehicle entertainment to passengers on a commercial passenger vehicle, the centralized architecture system comprising:
 a housing of the centralized architecture system locatable in a structure located in the commercial passenger vehicle, wherein the housing comprises:
  a printed circuit board (PCB) comprising at least one processor configured to:
   independently operate each of a plurality of virtual machines corresponding to a first set of display panels located in a rear portion of the structure, wherein each virtual machine has a privileged virtual operating system and is operable to perform operations related to an individual display panel of the first set of display panels;

receive, for a second set of one or more display panels, one or more video contents from a server located in the commercial passenger vehicle, wherein the first set of display panels comprise the second set of display panels;

decode the one or more video contents; and transmit the decoded one or more video contents to be displayed by the second set of display panels, wherein each of the plurality of virtual machines is independently operable to control playback functionality for the decoded one or more video contents associated with each display panel of the second set of display panels; and a plurality of audio video bridging microcontrollers located in the rear portion of the structure and communicatively coupled to receive audio and video content from an edge server located on the commercial passenger vehicle, wherein each audio video bridging microcontroller is communicably connected to one display panel and the PCB, and wherein each audio video bridging microcontroller is configured to receive a decoded video content from the PCB and send the decoded video content to the one display panel to display, wherein the housing and the first set of display panels of the centralized architecture system are independently replaceable in response to a higher performance or a lower power consumption related upgrade.

2. The system of claim 1, wherein the housing includes a plurality of PCBs that comprise the PCB and a second PCB, wherein the one or more virtual machines are operable to share memory resources and a same memory from a memory device located on the PCB, wherein a first display panel and a second display panel of the first set of display panels are communicably coupled to the PCB based on a first display resolution of the first display panel and the second display panel, and wherein a third display panel is communicably coupled to the second PCB based on a second display resolution of the third display panel, and wherein the second display resolution is higher than the first display resolution.

3. The system of claim 1, wherein the PCB comprises an audio digital signal processor (DSP) operable to decode one or more audio contents, wherein the decoded one or more audio contents correspond to the one or more virtual machines, and wherein the one or more virtual machines are operable to receive and send the decoded one or more audio contents to one or more audio connectors corresponding to the one or more virtual machine.

4. The system of claim 3, wherein the one or more audio content corresponds to the one or more video contents for the second set of display panels.

5. The system of claim 1, wherein the structure comprises at least two seats in the commercial passenger vehicle.

6. The system of claim 1, wherein the first set of display panels are located above the housing.

7. The system of claim 1, wherein the housing includes a fan or a heat sink.

8. The system of claim 1, wherein the first set of display panels includes touch panels.

9. A method of providing in-vehicle entertainment to passengers on a commercial passenger vehicle, the method comprising:

independently operating each of a plurality of virtual machines corresponding to a first set of display panels located in the commercial passenger vehicle, wherein each virtual machine has a privileged virtual operating system and performs operations related to an individual display panel of the first set of display panels;

receiving, for a second set of one or more display panels, one or more video contents from a server located in the commercial passenger vehicle, wherein the first set of display panels comprise the second set of display panels;

decoding the one or more video contents; and transmitting the decoded one or more video contents to be displayed by the second set of display panels, wherein each of the plurality of virtual machines controls playback functionality for the decoded one or more video contents associated with each display panel of the second set of display panels.

10. The method of claim 9, wherein the one or more virtual machines share memory resources and a same memory from a memory device.

11. The method of claim 9, further comprising:

decoding one or more audio contents corresponding to the one or more virtual machines, wherein the one or more virtual machines receive and send the decoded one or more audio contents to one or more audio connectors corresponding to the one or more virtual machine.

12. The method of claim 11, wherein the one or more audio content corresponds to the one or more video contents for the second set of display panels.

13. The method of claim 9, wherein the operating of the plurality of virtual machines, the receiving of the one or more video contents, the decoding of the one or more video contents, and the transmitting of the decoded one or more video contents are performed by a processor on a printed circuit board (PCB) located in a housing below the first set of display panels.

14. The method of claim 9, wherein the first set of display panels are located in a rear portion of a structure in the commercial passenger vehicle.

15. The method of claim 13, wherein the structure comprises at least two seats in the commercial passenger vehicle.

16. A non-transitory computer readable program storage medium having code stored thereon, the code, when executed by a processor, causing the processor to:

independently operate each of a plurality of virtual machines corresponding to a first set of display panels located in a commercial passenger vehicle, wherein each virtual machine has a privileged virtual operating system and is operable to perform operations related to an individual display panel of the first set of display panels;

receive, for a second set of one or more display panels, one or more video contents from a server located in the commercial passenger vehicle, wherein the first set of display panels comprise the second set of display panels;

decode the one or more video contents; and transmit the decoded one or more video contents to be displayed by the second set of display panels, wherein each of the plurality of virtual machines is independently operable to control playback functionality for the decoded one or more video contents associated with each display panel of the second set of display panels.

17. The non-transitory computer readable program storage medium of claim 16, wherein the one or more virtual machines share memory resources and a same memory from a memory device.

18. The non-transitory computer readable program storage medium of claim 16, wherein the processor is further configured to:
   decode one or more audio contents corresponding to the one or more virtual machines, wherein the one or more virtual machines receive and send the decoded one or more audio contents to one or more audio connectors corresponding to the one or more virtual machine.

19. The non-transitory computer readable program storage medium of claim 18, wherein the one or more audio content corresponds to the one or more video contents for the second set of display panels.

20. The non-transitory computer readable program storage medium of claim 16, wherein the first set of display panels are located in a rear portion of a structure in the commercial passenger vehicle.

\* \* \* \* \*